Aug. 15, 1961     G. WEISS     2,996,062
CATALYTIC HEATING SYSTEM
Filed Oct. 1, 1956     2 Sheets-Sheet 1

INVENTOR.
GERHART WEISS
BY
ATTORNEY

Aug. 15, 1961  G. WEISS  2,996,062
CATALYTIC HEATING SYSTEM
Filed Oct. 1, 1956  2 Sheets-Sheet 2
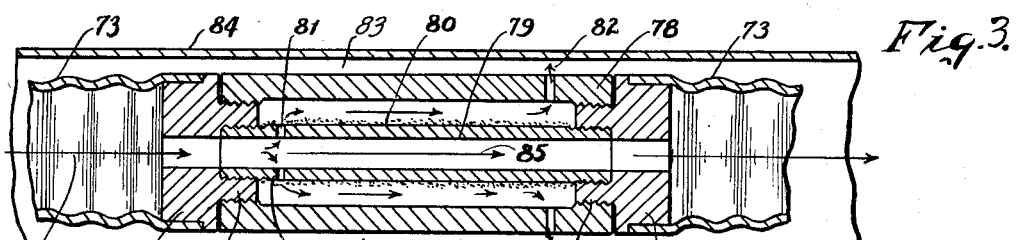
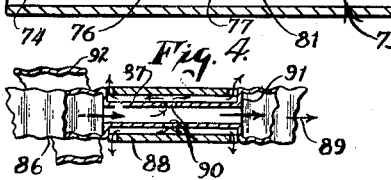
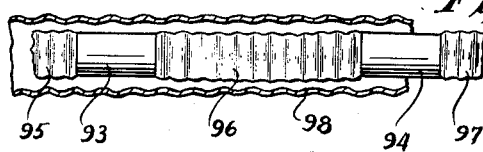
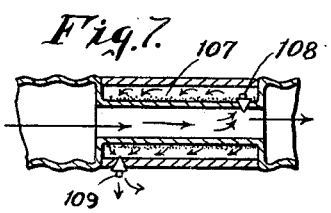
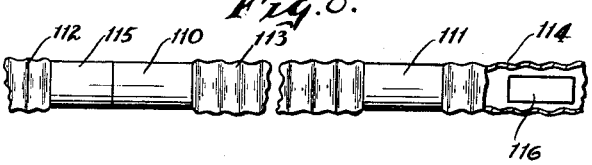
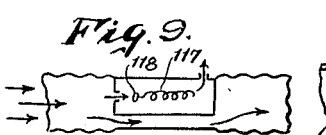
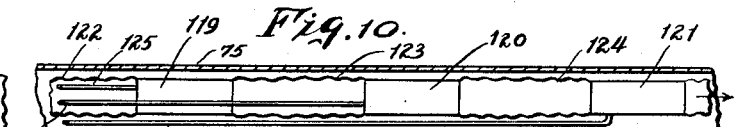
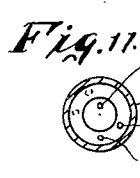
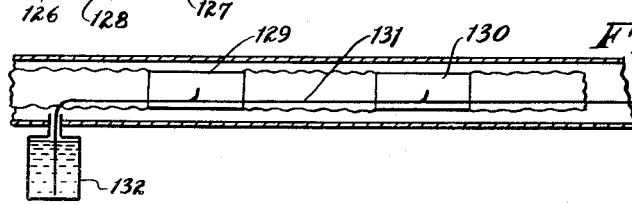
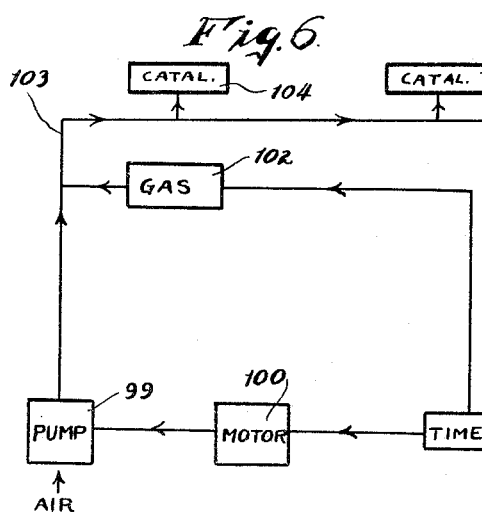
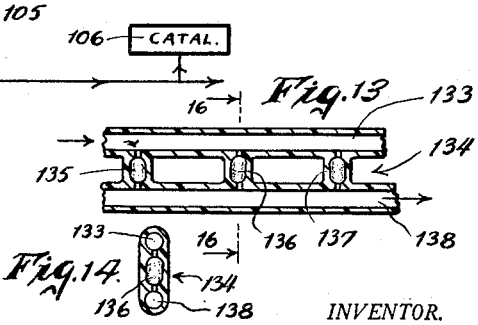
INVENTOR.
GERHART WEISS
BY
ATTORNEY

United States Patent Office 2,996,062
Patented Aug. 15, 1961

2,996,062
CATALYTIC HEATING SYSTEM
Gerhart Weiss, 76—70 172nd St., Flushing, N.Y.
Filed Oct. 1, 1956, Ser. No. 613,021
4 Claims. (Cl. 126—208)

This invention is a continuation in part of U.S. Serial No. 345,355, filed March 30, 1953, and issued October 2, 1956, as U.S. patent specification No. 2,764,969, Heating Device, and relates to an improved catalytic heating system.

One of the objects of the invention is a catalytic heating system including a number of heating elements and capable of rapid and assured start at any desired moment.

Another object of the invention is to extend the heat over a longitudinal body of relatively long extension.

A more specific object of the invention is to provide a longitudinal array of catalytic heating elements which are connected to the fuel supply in parallel and which are interconnected with each other in series so as to permit at least part of the heat produced by one element of the array to be transferred to a suceeding element of the same array.

A further object of the invention is a catalytic heating element of substantially two-dimensional extension in the form either of a planary surface or curved surface with catalyst being applied to a base either in powdered or solid form.

One important object of my invention is to provide an improved heating system of the type comprising a plurality of tubes through which an air-fuel mixture may be forced and containing a catalytic charge for flameless or flame combustion of the air-fuel mixtnure.

Without limitation thereto, one application of my invention is the provision of a suit incorporating such heating tubes for use by human beings under low temperature conditions. Said heating tubes are also suitable for use in both fixed and portable industrial installations.

Each heating tube comprises preferably a flexible outer tube which is open at one end for reception of the fuel-air mixture and closed at the other end. Said tube surrounds an inner tube comprising flexible tube sections alternating with rigid metal tube sections. The inner tube is closed at one end and open at the other end to permit the escape of exhaust gases.

Each rigid tube section includes an axially extending reaction tube of reduced diameter and openings leading from the reaction tube to the space between the inner tube and the outer tube. Each rigid tube section includes further orifices for communication betewen the preceding and succeeding flexible tube sections.

Each reaction tube bears a suitable catalytic charge. Air-fuel mixture passes from the space between the inner tube and the outer tube into the various reaction tubes, where the fuel undergoes flameless combustion with a resulting liberation of heat. The exhaust gases of the reaction tubes pass through the inner flexible tube sections and through the orifices connecting same and thence out of the outlet end of the inner tube.

I have found it possible to construct heater tubes of the above-described type which give off heat substantially uniformly over the entire length thereof. Ice formation on the catalytic charges is minimized by my construction. Once the reaction is started at the inlet end of a heater tube, the heat given off tends to warm the air-fuel mixture and also succeeding reaction tubes, thereby facilitating excitation of succeeding elements. Optionally, the air-fuel mixture may be externally pre-heated before entering the heater tube.

Other objects and advantages of my invention will become apparent from the following description, in conjunction with the annexed drawings, in which preferred embodiments are disclosed.

FIG. 3 represents in cross section a layer tube catalytic heating element.

FIG. 4 represents a modification of FIG. 3.

FIG. 5 represents longitudinal array of catalytic heating elements of the type shown in FIGS. 3 and 4.

FIG. 6 illustrates a preferred manner of operating a longitudinal array of catatylic heating elements.

FIG. 7 represents another modification of a catalytic heating element such as shown in FIGS. 3 and 4.

FIG. 8 shows an array of heating elements, such as shown in FIG. 5 but with certain modifiactions securing operation of such array.

FIG. 9 shows another layer type catalytic heating element embodying certain features of the invention.

FIGS. 10 and 11 in side and front views respectively show a specific method of feeding the fuel vapor into the array of catalytic heating elements.

FIG. 12 illustrates another method of feeding fuel vapor into a longitudinal array of heating elements in accordance with the invention.

FIGS. 13 and 14 in side and crossviews respectively present a further feeding method applied to a modified type of longitudinal array of heating elements in accordance with the invention.

Figure 1:
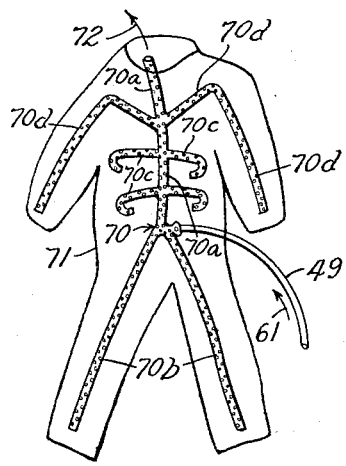
FIG. 1 is a diagrammatic view showing a suit having heater tubes in accordance with my invention.

FIG. 1 shows one application of the invention in which tube 49 is connected to a series of heater tubes 70 in a suit 71, said suit 71 being suitable for human wear. Said tube 49 is connected to the junction of a spine tube 70a and a pair of leg tubes 70b. Suitable rib tubes 70c and arm tubes 70d branch off from tube 70a. Each of the tubes 70a, 70b, 70c and 70d is open at its outer end or at a junction of 70 and 61. Some of the air-fuel mixture (whereby air may be replaced by any other oxidizing medium) from tube 49 passes through each of the tubes 70. Some or all of the mixture in each of the tubes 70 undergoes combustion, and exhaust gases leave the tubes 70 at their open ends. For example, exhaust gases leave tube 70a in the direction of arrow 72, or at junction of 70 and 61.

The distribution of tubes 70 results in the even heating of suit 71. Optionally, tubes 70 may be arranged in other ways for other heating purposes.

Figure 2:
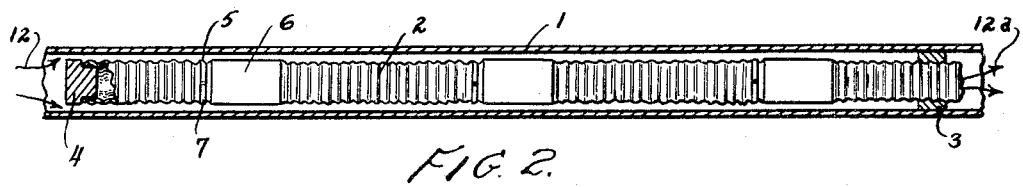
FIG. 2 is a longitudinal section, partly in elevation, of a heater tube in accordance with my invention.

FIG. 2 shows a section of tubing which is particularly suitable for use as one of the tubes 70, or a portion thereof, FIG. 3 shows a detail of FIG. 2.

FIG. 2 shows a longitudinal outer tube 1 which is preferably flexible and gas-impervious.

Tube 1 may be made of rubber or a suitable plastic. Tube 1 is open at both of its ends. The inlet end of tube 1 is its left end, as taken in FIG. 2.

Within tube 1 there is located an inner tube comprising sections of tubing 2 alternating with sections of rigid tubing 5, 6. Preferably, each tube section 2 is made of metal with an undulatory peripheral wall, as clearly shown in FIG. 2, in order that it may be somewhat flexible and also have considerable structural strength.

The inlet section of the inner tube is a tube section 2 and the inlet end of said inlet tube section 2 is sealed by any suitable plug 4.

Each rigid tube section comprises a male tube section 5 and a female tube section 6, both of which are preferably made of metal. Said tube section 5 is substantially cylindrical and solid and has respective coaxial, cylindrical end extensions 5a and 5b of reduced diameter. Said tube extension 5a is hollow and is adapted to fit frictionally within the outlet end of the bore of a tube section with said tube section 2 abutting tube 5. Said tube extension 5b is solid and its peripheral wall is screwthreaded.

Said tube section 6 is hollow and its peripheral wall is internally screwthreaded at the inlet end thereof. Tube section 6 and tube section 5 may be secured together by screwing tube extension 5b into the threaded end of tube section 6 until tube section 6 and tube section 5 abut each other.

The outlet end of tube section 6 is provided with an integral, hollow, cylindrical, male extension 6a of reduced diameter, which is adapted to fit frictionally within the inlet end of the bore of a tube section 2, with said tube section 2 abutting tube section 6.

Preferably, the external peripheral faces of said tube section 2 and said tube sections 5, 6 have substantially the same external diameter, with the outer peripheral faces of tubes 2 having circumferential grooves as a result of the undulatory construction thereof. As a result, a substantially annular space or duct 11 is provided between the inner peripheral wall of tube 1 and the outer peripheral wall of the tube sections 2, 5 and 6 when the axes of said tube sections 2, 5 and 6 are substantially aligned with the axis of tube 1. However, as will be apparent from the following description, such axial alignment is not necessary, and it is only necessary to secure the inner tube to tube 1 at the outlet end of the tubes.

As is shown in FIG. 2 the outlet end of duct 11 is blocked by a substantially annular and gas-tight plug 3. Said plug 3 fits within the bore of tube 1 at the outlet end thereof. The tube section 2 at the outlet end of the inner tube extends through the opening of plug 3.

In FIG. 3, showing in detail a reaction tube such as illustrated in FIG. 2 at 6, part 73 represents a preferably flexible tube consisting of metal, plastic, rubber or any other tubular material and having any desired cross section whether it be round, flat or any other shape.

Tube 73 may extend over any desired length and is provided with an intake permitting access of the air-fuel vapor mixture schematically indicated in FIG. 3 at 74.

At predetermined sections thereof tube 73 is interrupted by layer type catalytic heat elements such as shown at 75 consisting of copper rings 76 welded at one side to tube 73 and extending on the other side into a bushing 77; bushing 77 has an outer thread engaging a cover tube 78 made of metal or ceramic. The inner thread of bushing 77 is threaded over an inner or base cylinder 79 also consisting of metal or ceramic as the case may be.

Base cylinder 79 has applied to its outer surface a catalytic layer 80 of otherwise well-known structure which when in contact with a suitable air-fuel vapor mixture will cause this fuel mixture to be burned.

The air-fuel mixture is carried from intake 74 through the interior of copper ring 76 and base tube 79 through radial inlets 81 over catalytic layer 80 on base tube 79 to radial outlets 82 in cover tube 78 and from there conducted away in otherwise well known manner for example by providing an annular exhaust space 83 between feeder tube 73, ring 76 and cover cylinder 78 on the one side and an outer tube surrounding these elements at a predetermined distance therefrom as schematically indicated in FIG. 3 at 84.

The main feed stream of the air-fuel mixture is carried through the interior of base tube 79 in the direction of arrow 85 to other catalytic heat elements similar to that shown at 75 so as to feed all these heat elements in parallel. At the same time these various heat elements are arranged in series or cascade so as to permit at least part of the heat produced by one heat element to be transferred to a succeeding heat element thereby facilitating even distribution of heat, accelerating start and insuring continuous operation of the individual heat elements.

The fuel feed may be reversed.

Instead of pressure feed, suction feed may be utilized; the main feed stream may be arranged externally and the exhaust stream internally; all this without departing from the framework of this disclosure.

In the modification of FIG. 4 the flexible tube 86 is shown to be formed of one piece with inner or base tube 87; the catalytic layer is in the form of a solid ceramic element of cylindrical shape or sleeve, as schematically indicated at 88. The air-fuel stream passing through base tube 87 in the direction of arrow 89 enters upon the catalytic sleeve 88 through radial openings 90 arranged in the center of base tube 87, and after having passed over sleeve 88 and passages 91 provided at both ends of layer element 82, enters the exhaust space formed by outer tube 92.

Without departing from the scope of the invention the catalytic cylinder 88 may consist instead of a rigid or flexible sleeve of a number of discs or rings.

In FIG. 5, there are a number of catalytic elements 93 and 94 such as shown in FIGS. 3 and 4 at 75 and 88, interconnected by tubular portions or sections 95, 96, 97 and surrounded by a common outer tube 98 which of course can be omitted if overall exhaust into the atmosphere is desired, instead of guidance to a predetermined point of the atmosphere.

FIG. 6 illustrates in the form of a block diagram a manner of operation for a longitudinal array of catalytic heat elements in accordance with the invention.

Part 99 represents an air pump driven by a motor 100 under control of an electric timing switch 101 or otherwise well known construction. The gas or fuel supply source is indicated schematically at 102 and the desired gas air mixture is guided over line 103 to the various catalytic heat elements 104, 105, 106, etc. of the type shown in FIGS. 3, 4 or 5, or any other type, in accordance with the invention.

The timing switch 101 controls air pump motor 100 as well as gas supply 102 is so adjusted in well known manner that as soon as the gas supply 102 is stopped, air motor 100 continues to operate and through pump 99 continues to pump air through the system for a predetermined duration, say several minutes to clean the duct system from any residual gases, drive off reaction moisture and dry the elements thereby maintaining the efficiency of the catalytic heating elements and their readiness for a new heating cycle.

FIG. 7 shows a modified heater element in which the access of the fuel to the catalytic layer as well as the removal of the exhaust gases from such catalytic layer 107 is controlled by pressure actuated valves such as schematically indicated in FIG. 7 at 108, 109. Such valves will serve to separate the catalyst from the air-fuel vapor mixture in the duct in case of non-operation, as well as from external contamination.

The modification of FIG. 8 shows several catalytic heat elements arranged at 110, 111 interconnected by tubular portions 112, 113, 114 respectively.

In accordance with a specific embodiment of the invention the first heating element 110 of the array is provided with a pre-heater or starter 115 of otherwise well-known construction for example an electrical heating coil so as to facilitate the starting of this first heating element 110.

Such pre-heater 115 can also be a catalytic igniter wire of known structure consisting of a platinum spiral provided with a platinum sponge layer.

In addition there is provided at the output end of the array an odor absorbing medium schematically indicated at 116 for example a filter consisting of charcoal, silica gel or water.

In the modification of FIG. 9 at least one of the heating elements preferably the first one is shown to consist of a platinum wire schematically indicated at 117 provided in otherwise well known manner with a platinum sponge layer and connected at one end to a catalytic pellet schematically indicated at 118.

This arrangement if placed at the beginning of an array permits accelerated start of the array and if placed at the end of the array will serve more completely to burn out the exhaust gases and thereby reduce odor to a minimum.

The array of FIG. 10 and in cross section at FIG. 11 exemplifies an independent supply of a number of longitudinally arranged heating elements 119, 120, 121 interconnected by tubular sections 122, 123, 124. Heating elements 119, 120, 121 are fed in parallel by separate intake tubes or bores schematically indicated in FIGS. 10 and 11 at 125, 126, 127 respectively and arranged in an outer tube schematically indicated at 128. In this way the several heating elements may be fed independently from each other and predeterminedly.

In the modification of FIG. 12 the feeder line supplying the various catalytic heat elements schematically indicated at 129 and 130 respectively are fed by means of a predeterminedly dimensioned wick 131 immersed and supplied from a fuel tank schematically indicated at 132. In this way fuel feed is facilitated and if there is sufficient convection space around the wick the provision of a pump can be dispensed with; all this without departing from the scope of the invention.

In FIGS. 13 and 14 the air-fuel mixture is fed into a tube 133 carrying alongside suitably attached to it or made of one piece therewith, a carrier tube 134 containing an array of catalytic heater elements 135, 136, 137 of the type shown in FIGS. 3, 4, or 7, or any other appropriate type arranged perpendicularly with respect to the axis of the array over which the vapors are carried into another longitudinal tube 138 also arranged or attached alongside carrier tube 134 which may be dispensed with if necessary and if exhaust in the atmosphere is required or permitted.

While I have disclosed a preferred embodiment of my invention and have indicated various changes, omissions and additions which may be made therein, it will be apparent that various other changes, omissions and additions may be made in my invention without departing from the scope and spirit thereof.

I claim:
1. A heating system using catalytic combustion comprising a cascade of elongated tubes having their insides connected in series forming a substantially contiguous inner space, means for defining an annular outer space surrounding each of said tubes and substantially separate from said inner space; each of said tubes having an outer surface and on said surface a sheet-like layer of catalytic material extending mainly in the direction of and coextensive with said surface; and each of said tubes having outlet openings through the tube wall forming passages from said inner space to said layers; and means including a supply of air and fuel for forcing a mixture thereof by way of said inner space and said openings to said catalytic layer.

2. System according to claim 1 wherein said means for defining said outer space include a cover tube spaced from said layer and having exhaust openings displaced from said outlet openings in the direction of flow.

3. System according to claim 2 comprising an outer tube surrounding said cover tube and forming with said cover tube an exhaust space.

4. System according to claim 1 wherein said outlet openings in said tubes are arranged at the center of said tubes and wherein said means for defining said outlet openings include a cover tube spaced from said layer and having exhaust openings displaced with respect to said center openings both in the direction of flow and in opposite direction.

References Cited in the file of this patent

UNITED STATES PATENTS

| | | |
|---|---|---|
| 741,820 | O'Brien | Oct. 20, 1903 |
| 1,213,470 | Finlay | Jan. 23, 1917 |
| 2,042,690 | Weber | June 2, 1936 |
| 2,384,852 | Schmitt | Sept. 18, 1945 |
| 2,493,266 | Schmitt | Jan. 3, 1950 |
| 2,658,742 | Suter et al. | Nov. 10, 1953 |
| 2,800,891 | Rehorn | July 30, 1957 |